Nov. 24, 1953
L. ALEX
2,660,486
CLIP FOR PRECLUDING ROTATION OF SEGMENTS
OF OIL-RETAINING RING IN JOURNALS
Filed Sept. 17, 1951
2 Sheets-Sheet 2
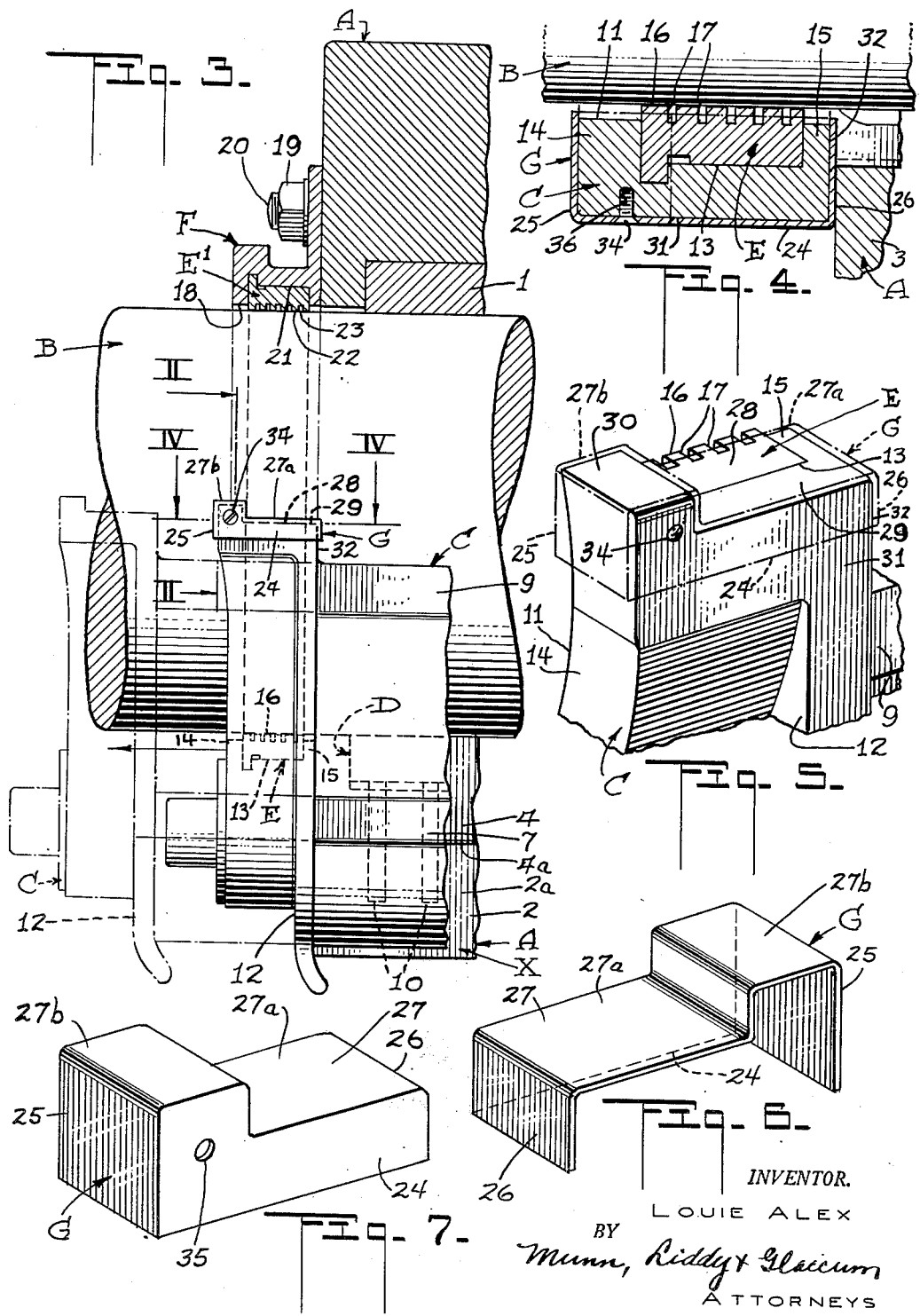
INVENTOR.
LOUIE ALEX
BY
Munn, Liddy & Glaccum
ATTORNEYS Patented Nov. 24, 1953

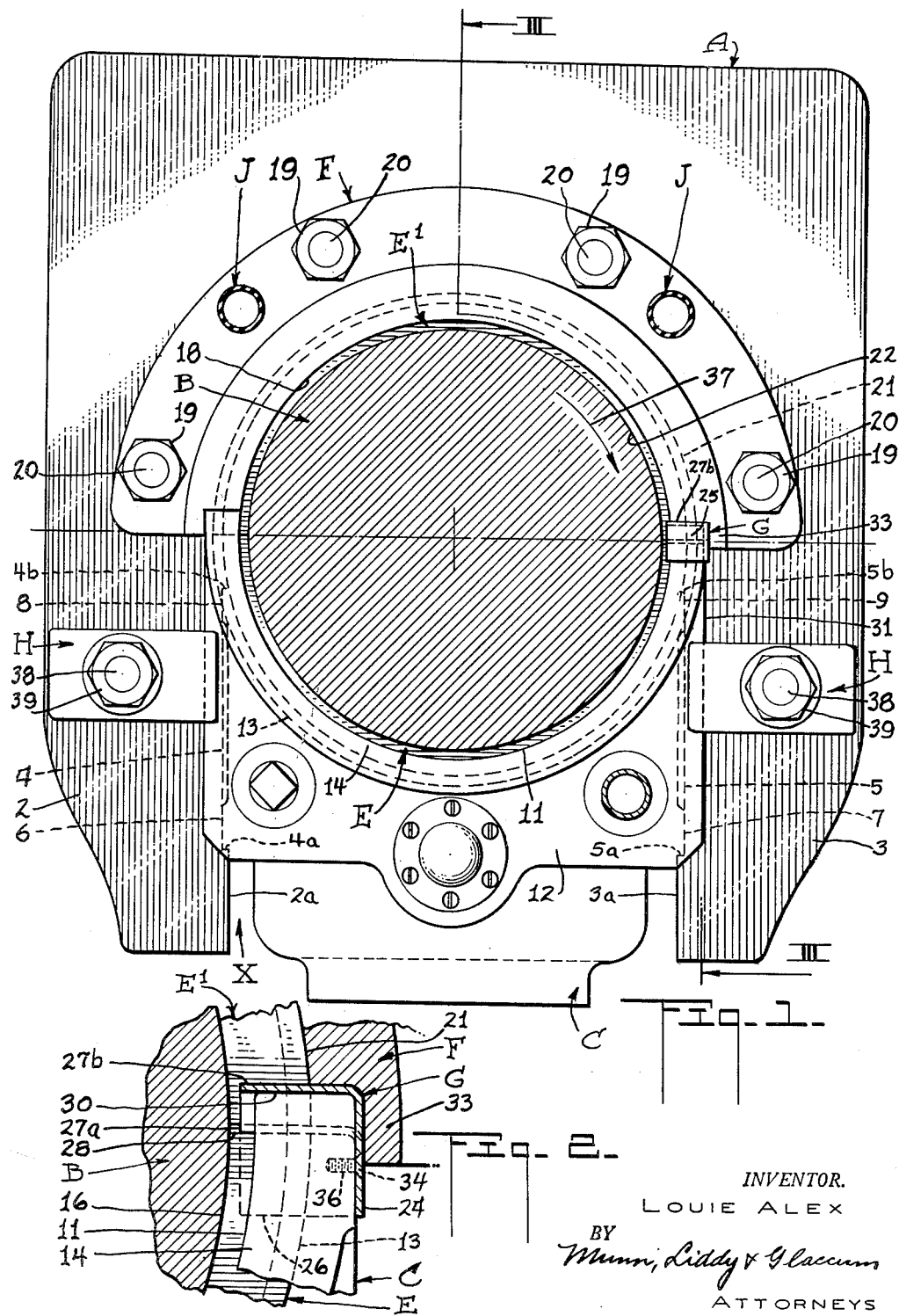

2,660,486

UNITED STATES PATENT OFFICE 2,660,486

CLIP FOR PRECLUDING ROTATION OF SEGMENTS OF OIL-RETAINING RING IN JOURNALS

Louie Alex, Oakland, Calif.

Application September 17, 1951, Serial No. 246,991

2 Claims. (Cl. 308—36.1)

The drive shafts of locomotives are journalled in stationary blocks which in turn are secured to the locomotive for supporting it. The drive shafts have wheels thereon which ride on the rails. It is necessary that the drive shafts be lubricated at the places where they are journalled in the stationary blocks. The present practice is to provide a driver box cellar and slidably mount this in the stationary block and under the locomotive shaft or axle. The driver box cellar is provided with a lubricating pad that is saturated with oil and this pad is held in yielding contact with that portion of the axle that extends through the journal. The driver box cellar carries a quantity of oil and wicks extend downwardly from the pad into the oil so as to transfer the oil to the pad and thence to the axle as needed.

It is necessary that the driver box cellar be inspected from time to time, usually at the end of each run of the locomotive in order to make sure that the locomotive axle is being lubricated properly. The driver box cellar is so mounted that upon the unscrewing of certain nuts, it can be moved out from engagement with the stationary block for inspection purposes and then it can be moved back in place and the nuts remounted on the threaded studs for holding the driver box cellar in place. Additional oil may be added to the driver box cellar during the inspection, or if necessary a new oil pad can be substituted for the used one. In order to prevent the oil from seeping out from the driver box cellar, the box is provided with a half circle oil ring that is yieldingly held against the lower half of the axle and prevents the passage of oil from the box. A mating half circle oil ring is carried by the stationary block and is held in place by a flange which is secured to the block. It is the practice to provide the upper half oil ring with a projection that enters a recess in the flange for holding the upper half oil ring from rotating with the axle. Every once in a while the projection will shear off and the rotation of the axle will cause the upper half oil ring to have a portion moved into the groove that receives the lower half oil ring. When this occurs it is impossible to remove the driver box cellar by sliding it out from the stationary box because the upper half oil ring will have its portion extending into the groove in the driver box cellar and this portion will act as a lock or stop and will prevent the free sliding of the driver box cellar into a position where the lubricating pad may be inspected.

When the driver box cellar is locked in position by the upper half oil ring moving out of its accustomed position, it is necessary to remove oil lines that extend through openings in the flange that secures the upper oil ring half in place. It is also necessary to remove the flange and then the upper half oil ring can be rotated to free it from the groove in the driver box cellar, whereupon the box can be removed for inspection. It requires two or three men and considerable time to accomplish the removal of the flange that holds the upper oil ring when the latter moves out of position. Every once in awhile, the driver box cellar is not inspected when the upper ring half has moved into a position to interfere with its removal. Should the box be in need of inspection at the time, as for example the lubricating pad having run dry because of lack of oil in the box, a "hot box" could develop on the subsequent run with possible serious results in case of an accident.

The principal object of my invention is to provide a clip that may be placed at the juncture between an end of the flange that holds the upper oil ring and the top of the driver box cellar, this clip extending between the opposed ends of the upper and lower half oil rings and being secured between the flange and the driver cellar so as to be held in place by these two members. It will be seen that so long as the clip remains in position and extends between the opposed ends of the upper and lower half oil rings, it is physically impossible for either half ring to rotate with the axle. Therefore, the upper half oil ring can at no time extend into the groove that receives the lower half oil ring and the result is the driver box cellar can be removed for inspection at any time desired and the upper half oil ring will not prevent such movement.

A further object of my invention is to provide a device of the type described which is extremely simple in construction and consists of a single member shaped in a particular manner. Furthermore, the device can be applied to a standard stationary block and driver box cellar without any alterations being necessary in either of these members. The device is shaped so as to fit snugly in place and when once mounted in position, it cannot be removed until the driver box cellar is removed for inspection. So long as the device does remain in position the two half oil rings will be held against rotation.

Other objects and advantages will appear in the following specification, and the novel features of the device will be particularly pointed out in the appended claims.

My invention is illustrated in the accompanying drawings forming a part of this application, in which:

Figure 1 is a front elevation of a stationary block and a driver box cellar for a locomotive axle and illustrates the position of the clip in its relation to the upper and lower half oil rings;

Figure 2 is a transverse vertical section taken along the line II—II of Figure 3 and is an enlargement of the clip and shows its position between the stationary block and the driver box cellar;

Figure 3 is a longitudinal section through the stationary block and driver box cellar, parts being shown in elevation for clarity;

Figure 4 is an enlarged horizontal section taken along the line IV—IV of Figure 3;

Figure 5 is a perspective view of a portion of the driver box cellar and illustrates the position of the clip on the box;

Figure 6 is an isometric view of the clip showing it from one position; and

Figure 7 is another isometric view of the same clip showing it from another position.

While I have shown only the preferred form of my invention, it should be understood that various changes or modifications may be made within the scope of the appended claims without departing from the spirit and scope of the invention.

In carrying out my invention, I make use of a stationary block indicated generally at A in Figures 1 and 3. This block is secured to a locomotive, not shown, in the usual manner and it carries a Babbitt portion 1 that rests on top of a locomotive axle B. Referring to Figure 1, it will be seen that the stationary block has sides 2 and 3 that form a recess X extending upwardly from the bottom of the block and may be large enough to receive the locomotive axle B. The inner surfaces 2a and 3a of the sides 2 and 3, respectively, are made vertical and are provided with grooved runways 4 and 5 for slidably receiving a driver box cellar indicated generally at C.

The driver box cellar has longitudinally extending ribs 6 and 7 on its outer sides that are slidably received in the grooved runways 4 and 5, respectively. The lower edges of the ribs 6 and 7 rest on shoulders 4a and 5a that are formed at the lower sides of the grooved runways 4 and 5. The driver box cellar also has a pair of upper longitudinally extending ribs 8 and 9 that are slidably received in the upper portion of the grooved runways 4 and 5. Shoulders 4b and 5b are provided at the tops of the grooved runways 4 and 5, respectively, and slidably receive the upper edges of the ribs 8 and 9. This construction permits the driver box cellar to be slidably received in the recess X formed between the inner surfaces 2a and 3a and to be moved in a horizontal plane into and out of engagement with the stationary block in much the same manner as a drawer is moved.

The driver box cellar is generally drawer-like in shape with an open top and four sides. Within the box there is removably mounted the oil applicator pad indicated generally at D in Figure 3. This lubricating pad is yieldingly held in contact with the under surface of the axle B by any means, not shown, and the pad has wicks 10 depending therefrom and with their lower ends immersed in the oil that is carried by the driver box cellar itself. The wicks feed the oil to the pad by capillary attraction and the pad in turn keeps the axle properly lubricated.

The driver box cellar is provided with a semi-circular recess 11 in its end wall 12, see Figure 1. This recess is large enough to receive the lower half of the axle B, and in fact has a slightly larger diameter than the diameter of the axle. The wall 12 of the driver box cellar has a groove 13 disposed concentric with the recess 11 and this groove is designed to receive a semi-circular lower oil ring segment E. The half ring segment is received between the walls 14 and 15 that form the sides of the groove 13, see Figure 3. The lower oil ring segment E is slidably received between the walls 14 and 15 and its inner periphery 16 is adapted to contact the lower half of the axle B. The inner surface 16 of the ring segment E is provided with a plurality of circumferentially extending grooves 17 and these are spaced a slight distance apart from each other as clearly shown in Figures 3 and 5. The grooves contain sealing material that bears against the lower half of the axle B and prevents any oil in the driver box cellar from flowing out through the recess 11. The lower half ring is yieldingly held in contact with the axle B by coil springs, not shown.

The stationary block A carries a semi-circular flange F, see Figures 1 and 3, and this flange is provided with a recess 18 of the same diameter as the recess 11 in the driver box cellar C. In fact, the two recesses 11 and 18 form an opening slightly larger than the diameter of the axle B and the axle extends through this opening. The flange F is secured to the stationary block A by any suitable fastening means, such as by nuts 19 mounted on threaded studs 20, see Figure 3, that extend from the block. The flange F has a semi-circular groove 21 therein that receives a semi-circular upper oil ring segment E1. The groove 21 has a width equal to the distance between the walls 14 and 15 that form the groove 13. The upper half oil ring segment E1 that is received in the groove 21 has its inner surface 22 contacting the upper surface of the axle B. The inner surface 22 is provided with a plurality of circumferentially extending grooves 23 and these grooves carry sealing material that bears against the outer circumference of the axle B.

The parts described thus far are of standard construction and form no part of my invention except in so far as they cooperate with the part now to be described. As set forth in the early part of the specification, the rotation of the axle B will have a tendency to rotate the half ring segments E and E1 therewith. Inasmuch as the upper half ring segment E1 can readily move into the groove 13 provided for the lower half ring segment E, should the lower ring segment E tend to rotate in its groove, it will be seen that the upper segment E1 must be held in its place at all times so that a portion of it will not extend into the groove 13 and prevent the driver box cellar from being moved to the left in Figure 3, as indicated by the dot dash line position in this figure, for inspection purposes. It has been customary to provide the upper half ring segment E1 with a projection, not shown, that extends outwardly from the segment and is received in a recess or socket, not shown, provided in the flange F and facing the inner wall of the groove 21. Such a projection has been known to shear off and to remain in the pocket while permitting the upper half ring segment to rotate with the axle.

In my invention, I provide a clip of the shape shown in Figures 6 and 7 for holding the upper and lower half oil ring segments in position at all times and this will permit the driver box cellar to be withdrawn for inspection at stated intervals, usually at the end of each run of the locomotive. The clip G is preferably stamped from a sheet of metal and has a side 24 of the shape shown in Figure 7 and end walls 25 and 26. The other side of the clip is open as clearly shown in Figure 6 and the clip has a stepped top wall 27.

In Figure 5 I show a perspective view of a portion of the driver box cellar C. This view shows the box proxided with the upper rib 9 that is received in the groove runway 5 and bears against the shoulder 5b. The figure further shows a portion of the top of the driver box cellar and this portion contains the end of the wall 15 that bounds one side of the groove 13. The lower half oil ring segment E is shown in place and the end 28 of this segment lies flush with the upper surface 29 of the driver box cellar. The wall 14 is also indicated in Figure 5 as bounding the other side of the groove 13 and the end of this wall projects above the surface 29 a slight distance so that the end 30 is disposed at a higher elevation than the surface 29.

I have shown the clip G placed in position on the surfaces 29 and 30 and the clip is indicated by the dot dash lines in Figure 5. The side 24 of the clip will contact with the outer side 31 the driver box cellar C. The end 25 of the clip will contact with the exposed side of the wall 14, while the end 26 will contact with a vertical wall portion 32 of the box C, see Figure 5. It will be seen that the stepped top wall 27 has its portion 27a overlying the surface 29, and its portion 27b overlying the surface 30. Figure 5 clearly shows the top portion 27a of the clip also overlying the ends 28 of the lower segment E.

Referring to Figure 2, it will be seen that the top wall portion 27a of the clip G extends over an end of the lower oil ring segment E. The flange F has an end portion 33 that extends down along the side 24 of the clip for a short distance, see also Figure 1. This is sufficient to hold the clip in place from lateral movement. The stepped top portion 27 receives the raised portion 30 of the box C, see Figure 5, and this prevents longitudinal movement of the clip. However, to prevent the clip from dropping off and becoming lost when the driver box cellar C is removed for inspection, I provide a screw 34 that enters an opening 35 in the side 24 of the clip and the screw is received in a tapped bore 36 provided in the box C, see Figure 2. Figure 4 also shows an enlarged view of the clip G and how it is held in place by the screw 34. The same figure also clearly shows the end walls 25 and 26 while the dot dash line represents the edge of the stepped top 27. The stepped top does extend over the end of the lower half oil ring segment E.

From the foregoing description of the various parts of the device, the operation thereof may be readily understood.

It is possible to provide right and left hand clips for the driver box cellar. Only one clip need be used for a box and the one preferred is the one that will be in a forward position of the axle B when considering the rotation of the axle. For example, in Figure 1 the arrow 37 illustrates that the shaft B is rotating in a clockwise direction. The clip G is therefore preferably placed at the right hand side of the box C when looking at Figure 1. The top wall portion 27a of the clip will be interposed between the half ring segments E and E1 and since the clip is held against movement, this wall portion will prevent any movement of the half ring segments in their grooves. There is usually enough space between the adjacent ends of the upper and lower half ring segments to receive the top wall portion 27a of the clip therebetween and there is also usually enough space between the end of the flange F and the adjacent ends of the walls 14 and 15 to receive the top wall 27. If this space is not sufficient, a slight grinding away of the interfering surfaces will provide sufficient space for the clip without harming the block A and box C.

The driver box cellar C is normally held in closed position by lock levers H shown in Figure 1 and disposed at the end of the stationary block A. The lock levers have openings for receiving studs 38 that project from the face of the block A. Nuts 39 are threaded on to the studs and force the lock levers H into clamping relation with respect to the end of the wall 12 of the driver box cellar. When it is desired to inspect the driver box cellar C, the nuts 39 are removed and so likewise are the lock levers H. The driver box cellar is now free to be moved to the left in Figure 3 as indicated by the arrow. The dot dash line position in this figure indicates the box as being partially moved. The half ring segments E and E1 will not interfere with this movement because they have been maintained in place by the clip G. The clip will move the driver box cellar and will remain attached thereto by the screw 34. The driver box cellar C can be inspected when removed and then reinserted into the space X.

Referring to Figure 1, it will be seen that the flange F is not only attached to the stationary block A by the nuts 19 mounted on the studs 20, but in addition, oil line hoses J extend through openings provided in the flange F. If the clip G were not used, the half ring segments would rotate so as to be partially extended into both grooves 13 and 21. It would then be necessary to disconnect the oil line hoses J and remove the four nuts 19 in order to free the flange F from the stationary block A before the top oil ring segment E1 could be removed. This requires considerable time and it takes several men to do the work inasmuch as the workmen must crawl under the locomotive before they can gain access to the nuts 19 and the oil line hoses J. After the flange F is removed, the oil ring segments E and E1 can be rotated to free the upper segment E1 from the lower groove 13.

All of this necessary removal of the flange F is done away with by the use of the clip G. The clip will hold the half oil ring segments in proper position at all times. When removing the driver box cellar C for inspection, it is merely necessary to free the nuts 39 from the studs 38 and then the box C can be slid to the left when looking at Figure 3 and entirely removed from the block A.

I claim:

1. The combination with a journal for receiving an axle and including a stationary block; a driver box cellar removably secured to the stationary block and having a semi-circular groove that is concentric with the longitudinal axis of the axle; a flange carried by the stationary block and having a semi-circular groove that is concentric with the axle axis and mates with the first mentioned groove when the box cellar is in operative position; a lower half circular oil ring segment received in the semi-circular groove formed in the box cellar; and an upper half circular oil ring segment received in the semi-circular groove formed by the flange; of a clip having a flat wall positioned between the adjacent ends of the lower and upper half oil ring segments and also positioned between the top of the driver box cellar and an adjacent portion of the flange for preventing the rotation of the oil ring segments around the axle, and means for removably securing the clip to the driver box cellar; said means not interfering with the removal of the box cellar from the block.

2. A unitary clip for use in precluding rotation of segments of an oil-retaining ring in journals, and defining a stepped hollow body comprising: a flat side wall; a pair of spaced-apart end walls paralleling each other, and extending at substantially right angles to said side wall; and a stepped top wall disposed at substantially right angles to said side and bridging between the end walls; the top wall defining upper and lower steps interconnected by a vertical riser; the clip being entirely open on both the side and bottom thereof opposite said side wall and the stepped top wall, respectively; said side and end walls defining lower marginal rims at the bottom of the clip body; the interior of the clip above these rims being unobstructed from below up to the stepped top wall.

LOUIE ALEX.

References Cited in the file of this patent

UNITED STATES PATENTS

| Number | Name | Date |
|---|---|---|
| 330,343 | Moore | Nov. 10, 1885 |
| 2,082,944 | Evans | June 8, 1937 |
| 2,341,080 | Burkholder | Feb. 8, 1944 |
| 2,558,183 | Kosatka | June 26, 1951 |